United States Patent
Mulcahy (10) Patent No.: US 10,786,743 B2
(45) Date of Patent: Sep. 29, 2020

(54) MOBILE GAME EXPERIENCE

(71) Applicant: Marc A. Mulcahy, Lakeside, MT (US)

(72) Inventor: Marc A. Mulcahy, Lakeside, MT (US)

( * ) Notice: Subject to any disclaimer, the term of this patent is extended or adjusted under 35 U.S.C. 154(b) by 0 days.

(21) Appl. No.: 15/990,277

(22) Filed: May 25, 2018

(65) Prior Publication Data
US 2018/0272236 A1 Sep. 27, 2018

Related U.S. Application Data

(63) Continuation-in-part of application No. 15/371,534, filed on Dec. 7, 2016, now abandoned.

(51) Int. Cl.
*A63F 13/30* (2014.01)
*A63F 13/837* (2014.01)
*A63F 13/216* (2014.01)
*A63F 13/53* (2014.01)
*H04W 4/02* (2018.01)

(52) U.S. Cl.
CPC .......... *A63F 13/837* (2014.09); *A63F 13/216* (2014.09); *A63F 13/30* (2014.09); *A63F 13/53* (2014.09); *H04W 4/023* (2013.01); *A63F 2300/8076* (2013.01)

(58) Field of Classification Search
CPC ...................................................... A63F 13/00
See application file for complete search history.

(56) References Cited

U.S. PATENT DOCUMENTS

| 9,308,437 | B2 * | 4/2016 | Carter .................. A63F 9/0291 |
| 9,504,907 | B2 * | 11/2016 | Carter ...................... F41G 3/26 |
| 9,901,825 | B2 * | 2/2018 | Fisher ..................... A63F 13/58 |
| 10,279,261 | B2 * | 5/2019 | Hall ........................ A63F 13/12 |
| 2007/0190494 | A1 * | 8/2007 | Rosenberg .............. A63F 13/12 434/11 |
| 2013/0005417 | A1 * | 1/2013 | Schmidt ................ A63F 13/213 463/5 |
| 2014/0064034 | A1 * | 3/2014 | Zhang ..................... G01S 11/14 367/127 |
| 2016/0228770 | A1 * | 8/2016 | Hall ........................ A63F 13/12 |
| 2018/0154268 | A1 | 6/2018 | Mulcahy |
| 2018/0272235 | A1 * | 9/2018 | Lee ........................ A63F 13/216 |
| 2019/0081848 | A1 * | 3/2019 | Zou .................. H04L 29/06034 |

* cited by examiner

*Primary Examiner* — Sunit Pandya
(74) *Attorney, Agent, or Firm* — Faegre Drinker Biddle & Reath LLP (57) ABSTRACT

A mobile game experience includes an interactive game in which a first user uses a first mobile device, to simulate targeting a second user, using a second mobile device, with a selected firearm. The first mobile device displays an indication of a location of the second mobile device and determines an effective range of a selected firearm. Based, in part, on the firearm's range and the distance between the two mobile devices, a determination is made as to whether a simulated shot from the first mobile device is a hit or a miss.

17 Claims, 3 Drawing Sheets

MOBILE GAME EXPERIENCE

CROSS-REFERENCE TO RELATED APPLICATIONS

This application claims priority to U.S. application Ser. No. 15/371,534, filed on 7 Dec. 2016, the entirety of which is hereby incorporated herein by reference for all purposes.

BACKGROUND

Typically, in location-based mobile games, global positioning service (GPS) technology is used to show geographical locations to a user, but does not facilitate interaction with other users.

SUMMARY

Embodiments include a method for facilitating a mobile game experience is provided, the mobile game experience comprising an interactive game in which a first user uses a first mobile device, to simulate targeting a second user, using a second mobile device, with a selected firearm, wherein the first mobile device includes a first display device and the second mobile device includes a second display device, the method comprising: presenting, via the first display device, a map, the map comprising a first location indicator that corresponds to a current location of the first mobile device and a second location indicator that corresponds to a current location of the second mobile device; receiving a user input indicating a user selection of the second mobile device to be a target; receiving a user input indicating a user selection of a selected firearm; determining an effective range of the selected firearm; receiving a user input indicating a user selection of a firearm trigger, wherein the user selection of the firearm trigger corresponds to a simulation of firing a simulated shot at the target; determining, using a global positioning system (GPS) output, a current distance between the first mobile device and the second mobile device; determining, based on the current distance and the effective range of the selected firearm, whether the simulated shot is a hit or a miss; and presenting, via the first display device, a shot indicator that indicates whether the simulated shot was a hit or a miss.

In embodiments, a method for facilitating a mobile game experience comprises: receiving a first global positioning system (GPS) signal associated with a first mobile device having a first display device, the first GPS signal indicating a current location of the first mobile device; presenting, via the first display device, a map, the map comprising a first location indicator that corresponds to the current location of the first mobile device; receiving a second GPS signal associated with a second mobile device having a second display device, the second GPS signal indicating a current location of the second mobile device; presenting, on the map and via the first display device, a second location indicator that corresponds to the current location of the second mobile device; receiving a user input indicating a user selection of the second mobile device to be a target; receiving a user input indicating a user selection of a selected firearm; receiving a user input indicating a user selection of a firearm trigger, wherein the user selection of the firearm trigger corresponds to a simulation of firing a shot at the target; determining, in response to receiving the user input indicating the user selection of the firearm trigger, a current distance between the first mobile device and the second mobile device; determining an effective range of the selected firearm; determining, based on the current distance and the effective range of the selected firearm, whether the shot is a hit or a miss; and presenting, via the first display device, a shot indicator that indicates whether the shot was a hit or a miss.

According to embodiments, one or more computer-readable media having embodied thereon computer-executable instructions that are configured to cause one or more processors, upon execution, to perform a method for facilitating a mobile game experience, comprise: presenting, via the first display device, a map, the map comprising a first location indicator that corresponds to a current location of the first mobile device and a second location indicator that corresponds to a current location of the second mobile device; receiving a user input indicating a user selection of the second mobile device to be a target; receiving a user input indicating a user selection of a selected firearm; determining an effective range of the selected firearm; receiving a user input indicating a user selection of a firearm trigger, wherein the user selection of the firearm trigger corresponds to a simulation of firing a simulated shot at the target; determining, using a global positioning system (GPS) output, a current distance between the first mobile device and the second mobile device; determining, based on the current distance and the effective range of the selected firearm, whether the simulated shot is a hit or a miss; and presenting, via the first display device, a shot indicator that indicates whether the simulated shot was a hit or a miss.

While multiple embodiments are disclosed, still other embodiments of the disclosed subject matter will become apparent to those skilled in the art from the following detailed description, which shows and describes illustrative embodiments of the disclosure. Accordingly, the drawings and detailed description are to be regarded as illustrative in nature and not restrictive.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

As used herein in association with values (e.g., terms of magnitude, measurement, and/or other degrees of qualitative and/or quantitative observations that are used herein with respect to characteristics (e.g., dimensions, measurements, attributes, components, etc.) and/or ranges thereof, of tangible things (e.g., products, inventory, etc.) and/or intangible things (e.g., data, electronic representations of currency, accounts, information, portions of things (e.g., percentages, fractions), calculations, data models, dynamic system models, algorithms, parameters, etc.), "about" and "approximately" may be used, interchangeably, to refer to a value, configuration, orientation, and/or other characteristic that is equal to (or the same as) the stated value, configuration, orientation, and/or other characteristic or equal to (or the same as) a value, configuration, orientation, and/or other characteristic that is reasonably close to the stated value, configuration, orientation, and/or other characteristic, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities, etc.); preferences; and/or the like.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

Although the term "block" may be used herein to connote different elements illustratively employed, the term should not be interpreted as implying any requirement of, or particular order among or between, various steps disclosed herein unless and except when explicitly referring to the order of individual steps.

DETAILED DESCRIPTION

Embodiments of the subject matter disclosed herein are configured to facilitate a "Target Mode" experience as part of a mobile game experienced configured for mobile devices. Embodiments of the subject matter include GPS software and mapping technologies to measure and govern ranges or distances between multiple, live, and/or moving mobile devices, then uses this data in conjunction with various distance-related aspects of cell phone applications.

For instance, according to embodiments of the subject matter disclosed herein, players may be automatically notified whenever another logged in player's mobile device comes within a targeting zone (e.g., one mile of their location). In embodiments, target Mode may automatically track all players' mobile devices within the one-mile distance, with each player's location marked with a floating map pin. Tapping a marker pin may facilitate indicating that the corresponding mobile device is a target, and may initiate using the live tracking distance between the target and the player as part of the criteria when calculating a hit or miss shot taken at this specific target.

According to embodiments, for example, tapping a "Target Mode" button at any time causes an associated imaging device to activate, and a representation of live video data to be performed. When a player uses their mobile device's camera to take a picture (e.g., simulate a shot) at another player, Target Mode uses the distance measurement between the two mobile devices to determine whether the simulated shot is a hit or a miss. Target Mode determines whether a simulated shot is a hit or miss based, at least in part, on whether or not the selected firearm being used by the players' mobile device at the time of the simulated shot is within the specified distance range for that mobile devices in the real world, so any simulated shot taken outside this range may be automatically determined to be a miss by Target Mode. In embodiment, Target Mode may send a warning to the (out-of-Range) target telling them that a player has taken a shot at them. A simulated shot within the specified range may or may not be determined a hit.

According to embodiments, this second "hit" determination comes from whether or not any part of the target's head or body is touching (e.g., overlapped by) a simulated sight marking such as, for example, a red dot. In embodiments, each firearm has a different sized red dot visible on the camera screen. For instance, when a pistol is being used, the red dot may be larger, due to the closeness of proximity and smaller range of the firearm. In embodiments, once Target Mode has determined that a shot was within the range of the selected firearm at the time of the shot, Target Mode may be configured to transmit the captured image to the target's mobile device. The target may receive the photo and look at it to see if the shot includes the red dot hitting or covering any part of their head or body. If this is the case, then the target taps the confirm button to confirm the shot was a hit.

Figure 1:
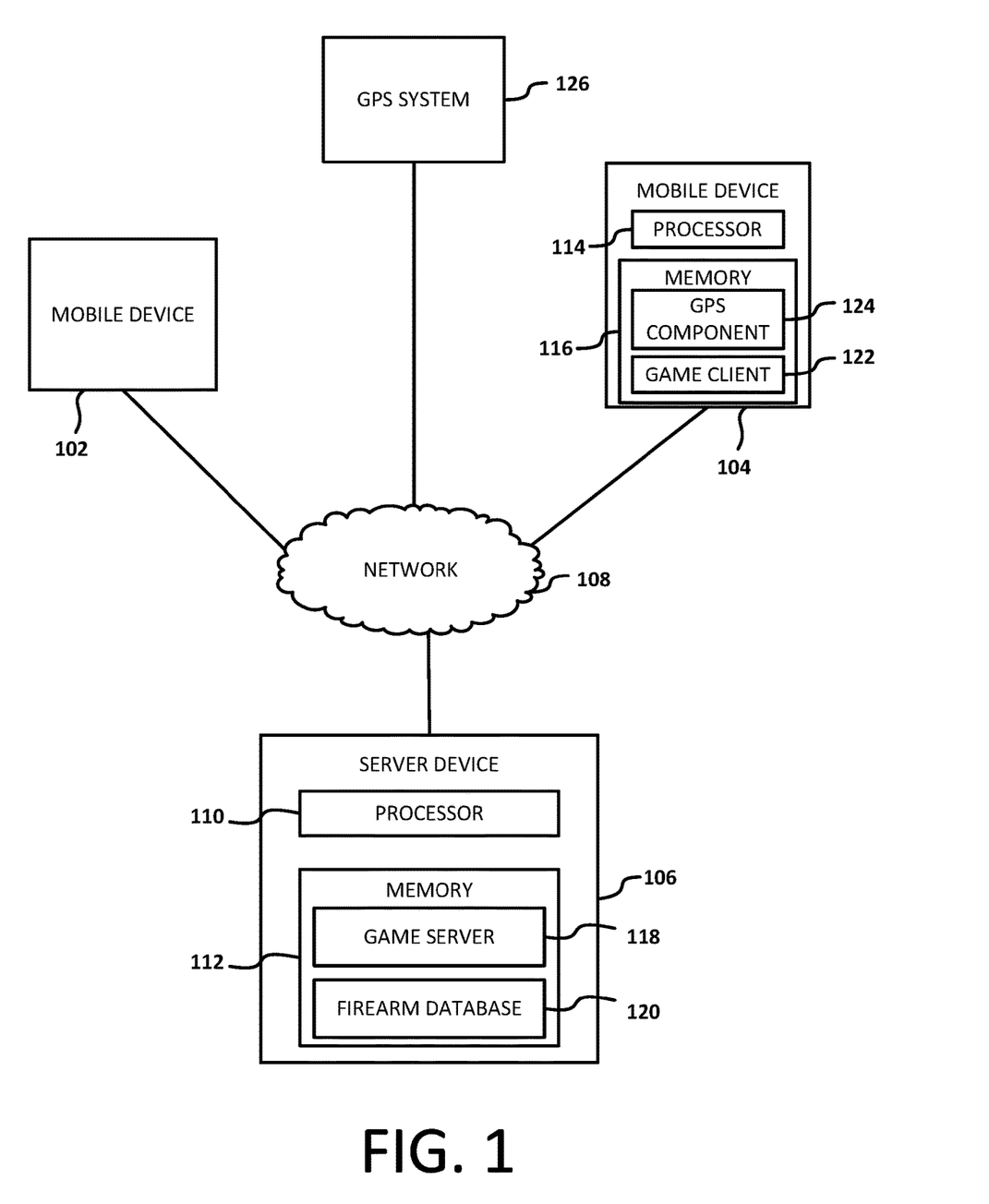
FIG. 1 is a block diagram depicting an illustrative system for facilitating an interactive mobile game featuring a target mode, in accordance with embodiments of the present disclosure.

FIG. 1A is a block diagram of an illustrative operating environment 100 configured to facilitate providing an interactive mobile game experience, in accordance with embodiments of the subject matter disclosed herein. As shown in FIG. 1, the illustrative operating environment 100 includes a first mobile device 102, a second mobile device 104, and a server device 106. According to embodiments, the mobile device 102 and/or the mobile device 104 may be, be similar to, include, or be included in any kind of mobile device capable of instantiating a mobile gaming application, as described herein. That is, for example, in embodiments, the mobile device 102 and/or the mobile device 104 may be, be similar to, include, or be included in any number of different types of mobile computing devices such as, for example, smartphones, tablets, laptops, smart cards, personal digital assistants (PDAs), enterprise digital assistants, graphing calculators, handheld gaming consoles, portable media players, digital cameras, automobile infotainment systems, wearable computers (e.g., smartwatches, smart glasses, smart wristbands, etc.), and/or the like.

The server device 106 may be, be similar to, include, or be included in any number of different types of computing devices capable of instantiating a game server such as, for example, desktops, workstations, mobile computing devices, and/or the like. It should be further understood that, although the operating environment 100 is depicted as including two mobile devices and one server device, illustrative operating environments may include any number of mobile devices and/or server devices. In embodiments, for example, an operating environment may have multiple server devices across which is distributed processing for implementing a game server.

A network 108 facilitates communications between two or more of the mobile devices 102, 104 and the server device 106. In embodiments, the network may be, be similar to, or include, any number of different types of communication networks such as, for example, a bus network, a short messaging service (SMS), a local area network (LAN), a wireless LAN (WLAN), a wide area network (WAN), the Internet, a P2P network, custom-designed communication or messaging protocols, and/or the like. In embodiments, the network 108 may include multiple, connected, networks.

According to embodiments, various components of the operating environment 100, illustrated in FIG. 1, may be implemented on one or more computing devices. A computing device may include any type of computing device suitable for implementing embodiments of the disclosure. Examples of computing devices include specialized computing devices or general-purpose computing devices such as "workstations," "servers," "laptops," "desktops," "tablet computers," "hand-held devices," "general-purpose graphics processing units (GPGPUs)," "mobile devices," "smart-phones," "tablets," "wearable computers," and/or the like, all of which are contemplated within the scope of FIG. 1 with reference to various components of the operating environment 100.

In embodiments, a computing device includes a bus that, directly and/or indirectly, couples the following devices: a processor (e.g., the processor 110 and/or the processor 114), a memory (e.g., the memory 112 and/or 116), an input/output (I/O) port (not shown), an I/O component (not shown), and a power supply (not shown). Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, memory (e.g., the memory 112 and/or 116) includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In embodiments, the memory 112 and/or 116 stores computer-executable instructions for causing a processor (e.g., the processor 110 and/or the processor 114) to implement aspects of embodiments of system components discussed herein and/or to perform aspects of embodiments of methods and procedures discussed herein.

Computer-executable instructions may include, for example, computer code, machine-useable instructions, and the like such as, for example, program components capable of being executed by one or more processors associated with a computing device. Examples of such program components include the game server 118, the firearm database 120, the game client 122, and the GPS component 124. It should be understood that the mobile device 102 may also include features similar to those illustrated in connection with the mobile device 104. Program components may be programmed using any number of different programming environments, including various languages, development kits, frameworks, and/or the like. Some or all of the functionality contemplated herein may also, or alternatively, be implemented in hardware and/or firmware.

Figure 2:
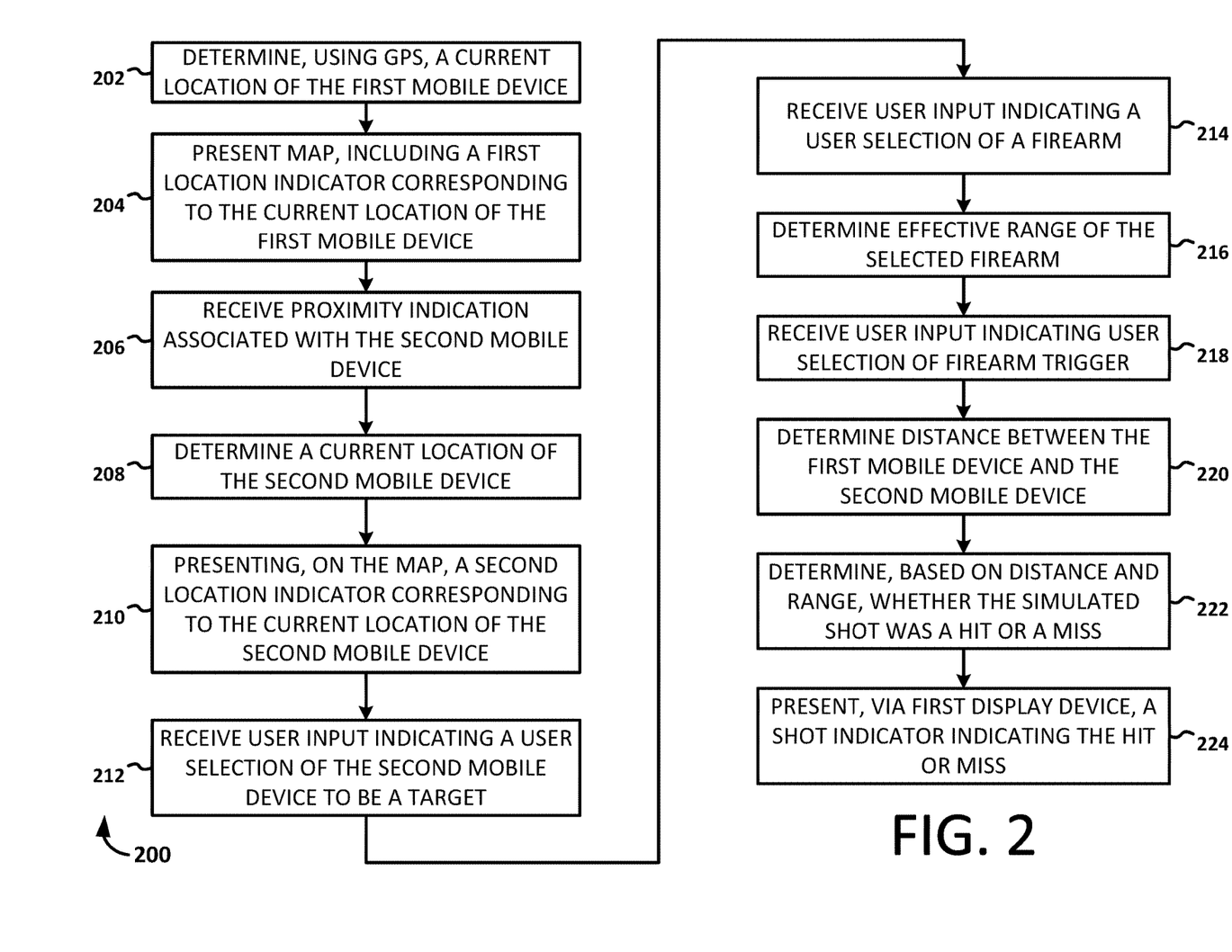
FIG. 2 is a flow diagram depicting an illustrative method for facilitating a target mode in an interactive mobile game, in accordance with embodiments of the present disclosure.
Figure 3:
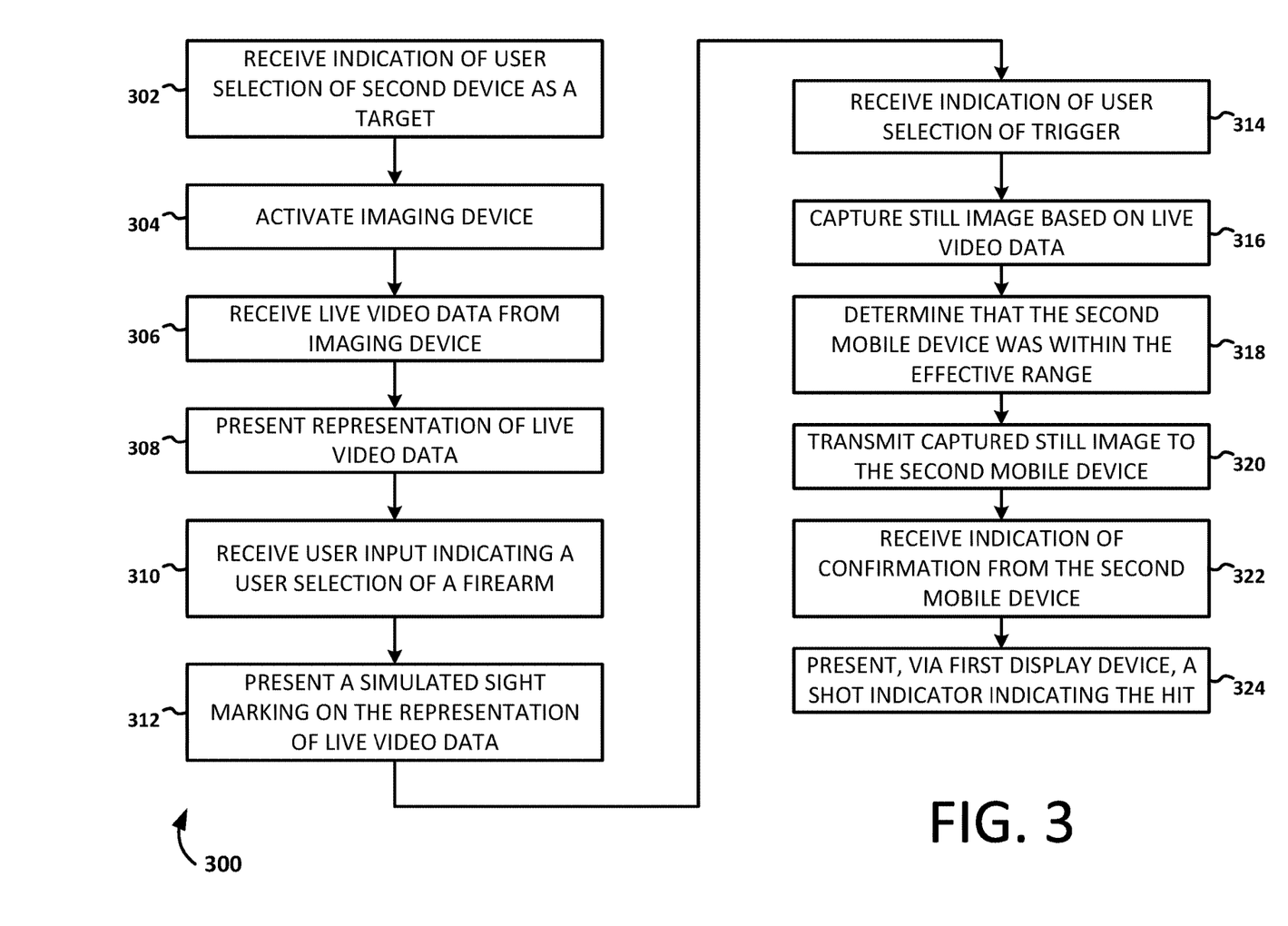
FIG. 3 is a flow diagram depicting another illustrative method for facilitating a target mode in an interactive mobile game, in accordance with embodiments of the present disclosure.

According to embodiments, the game server 118 may be configured to facilitate a mobile game experience by interacting with a game client 122 instantiated on each mobile device 102 and 104. According to embodiments, any number of different components and/or functions of the mobile game may be performed by the game server 118, and/or the game client(s) 122. As explained herein, embodiments of the game experience involves a target mode in which a user associated with a first mobile device 102 may identify a second mobile device as a target. In response, the game client 122 (and/or game server 118) may be configured to perform aspects of embodiments of the methods 200 and/or 300 illustrated herein and described below in conjunction therewith, so as to simulate a shot at a target.

In embodiments, for example, a game client may receive a user selection of a firearm, and the game client 122 may interact with the game server 118 to determine whether a simulated shot was a hit or a miss. According to embodiments, that determination may be based, for example, on whether the second mobile device was within an effective range, corresponding to the selected firearm, of the first mobile device. That is, for example, the game server 118 may reference a firearm database 120 to identify an effective range for a selected firearm; and may obtain GPS signals from the mobile devices 102 and 104 to determine whether the second mobile device was within the effective range of the selected firearm. The mobile devices (and, in embodiments, the server device 106) may be configured to communicate with a GPS system 126 to obtain GPS signals indicating current locations of mobile devices 102 and 104. According to embodiments, the determination of whether a simulated shot was a hit or miss also may depend on the interaction of a simulated sight marking with a captured image of the user associated with the second mobile device.

The illustrative operating environment 100 shown in FIG. 1A is not intended to suggest any limitation as to the scope of use or functionality of embodiments of the present disclosure. Neither should the illustrative operating environment 100 be interpreted as having any dependency or requirement related to any single component or combination of components illustrated therein. Additionally, various components depicted in FIG. 1A may be, in embodiments, integrated with various ones of the other components depicted therein (and/or components not illustrated), all of which are considered to be within the ambit of the present disclosure.

FIG. 2 is a flow diagram depicting an illustrative method 200 for facilitating a mobile game experience, in accordance with embodiments of the disclosure. According to embodiments, any number of different aspects of embodiments of the method 200 may implemented by any number of aspects of embodiments of features of an operating environment such as, for example, the illustrative operating environment 100 depicted in FIG. 1. That is, for example, embodiments of the method 200 may be implemented in an operating environment having an interactive game in which a first user uses a first mobile device, to simulate targeting a second user, using a second mobile device, with a selected firearm, wherein the first mobile device includes a first display device and the second mobile device includes a second display device. According to embodiments, for example, any one or more of the steps described herein may be performed by the first mobile device, the second mobile device, and/or the server device.

As shown in FIG. 2, embodiments of the method 200 include determining (block 202), using a global positioning system (GPS), a current location of the first mobile device. A "current location" may refer to a location at the time that the location is determined, and may, in embodiments, include the location for some predetermined period of time after the location is determined. In embodiments, the first mobile device may determine its current location by referencing a GPS component integrated with the first mobile device, by referencing a GPS system, by receiving an indication of its current location from a game server, and/or the like. The illustrative method 200 also includes presenting (block 204), via the first display device, a map, where the map includes a first location indicator that corresponds to a current location of the first mobile device.

As shown, in embodiments, the first mobile device may receive (block 206) a proximity indication associated with the second mobile device. According to embodiments, the proximity indication may indicate that the second mobile device is within a targeting zone of the first mobile device. The targeting zone may be defined to be a zone of area and/or volume within a certain distance from the mobile device with which it is associated. That is, for example, in embodiments, the targeting zone of the first mobile device may include any location whose distance from the first mobile device is within the effective range of at least one firearm that is available to be used for taking a simulated shot with the first mobile device. In embodiments, the targeting zone may be defined to be any location within a predetermined distance of the mobile device with which it is associated such as, for example, one mile, two miles, and/or the like.

As shown in FIG. 2, the illustrative method 200 further includes determining (block 208) a current location of the second mobile device. As with the first mobile device, the current location of the second mobile device may be determined in any number of different ways, including, for example, by referencing a GPS component integrated with the second mobile device, by referencing a GPS system, by receiving an indication of its current location from a game server, and/or the like. The illustrative method 200 further includes presenting (block 210), on the map via the first display device, a second location indicator that corresponds to the current location of the second mobile device.

The illustrative method 200 further includes receiving (block 212) a user input indicating a user selection of the second mobile device to be a target. In embodiments, for example, the user of the first mobile device may select the second mobile device (as a simulation, e.g., for targeting the user of the second device) by selecting the second location indicator on the map (e.g., by touching the second location indicator with a finger or stylus, by hovering over the second location indicator with a mouse cursor and clicking a mouse button, by issuing a voice command to select the second location indicator, etc.).

The method 200 includes receiving (block 214) a user input indicating a user selection of a firearm, and determining (block 216) an effective range of the selected firearm. For example, in embodiments, the user of the first mobile device may select the firearm by selecting a representation thereof from a menu, interacting with a button or other widget on the screen, issuing a voice command, and/or the like. In embodiments, the firearm may be selected from a list of broad types of firearms (e.g., pistol, rifle, sniper rifle), may be a particular type of firearm (e.g., a make and model), and/or the like. In embodiments, any number of different choices may be provided to a user to facilitate selection of a firearm, customization of a firearm selection, and/or the like.

As shown in FIG. 2, the illustrative method 200 further includes receiving (block 218) a user input indicating a user selection of a firearm trigger, wherein the user selection of the firearm trigger corresponds to a simulation of firing a simulated shot at the target. In embodiments, upon detecting the user input indicating a user selection of the trigger, the first mobile device may be configured to receive updated current locations of the first and second mobile devices. As shown, the method 200 further includes determining (block 220), using a GPS output, a current distance between the first mobile device and the second mobile device.

Based on the determined current distance and the effective range of the selected firearm, a determination is made (block 222) as to whether the simulated shot is a hit or a miss. According to embodiments, determining whether the simulated shot was a hit or a miss may also be based on any number of other information, as well. For example, as described below in more detail with respect to the illustrative method 300 depicted in FIG. 3, the determination may be made, at least partially, based on a positioning of a simulated sight marking over a captured image of the user of the second mobile device. As shown in FIG. 2, the illustrative method 200 also includes presenting (block 224), via the first display device, a shot indicator that indicates whether the simulated shot was a hit or a miss. According to embodiments, the shot indicator may include any number of different types of representations such as, for example, a change in appearance of an aspect of the second location indicator, a textual notification, and/or the like. In embodiments, the first mobile device may provide, additionally or alternatively, an audible indication, a tactile indication, and/or the like.

FIG. 3 is a flow diagram depicting an illustrative method 300 for facilitating a simulated shot during a mobile game experience, in accordance with embodiments of the disclosure. According to embodiments, any number of different aspects of embodiments of the method 300 may implemented by any number of aspects of embodiments of features of an operating environment such as, for example, the illustrative operating environment 100 depicted in FIG. 1. That is, for example, embodiments of the method 300 may be implemented in an operating environment having an interactive game in which a first user uses a first mobile device, to simulate targeting a second user, using a second mobile device, with a selected firearm, wherein the first mobile device includes a first display device and the second mobile device includes a second display device. According to embodiments, for example, any one or more of the steps described herein may be performed by the first mobile device, the second mobile device, and/or the server device.

As shown in FIG. 3, the illustrative method 300 includes receiving (block 302) an indication of a user selection of the second mobile device as a target; and, in response to receiving that indication, activating (block 304) an imaging device. According to embodiments, the imaging device may be integrated with the mobile device (e.g., a smartphone camera, a camera mounted on smart glasses, etc.), communicably coupled to the mobile device (e.g., a stand-alone video camera that communicates with the mobile device, etc.), and/or the like. In embodiments, activating the imaging device may include causing the imaging device to transition from a dormant state to an active state, in which the imaging device is actively obtaining image data (e.g., live video data). In embodiments, activating the imaging device may include instantiating an application or other software utility associated with an imaging device and from which a user may selectively cause the imaging device to begin obtaining image data.

As shown in FIG. 3, the illustrative method 300 further includes receiving (block 306) live video data from the imaging device; and presenting (block 308), via the first display device, a representation of the received live video data. In embodiments, such as when the mobile device is a smartphone, the representation of the live video data may be presented using the camera utility of the smartphone. In other embodiments, the representation of the live video data may be presented through an interface associated with the game app. A representation of live video data includes a displayed video clip (which may, in embodiments, be live—presented as the imaging device obtains the live video data). In embodiments, one or more still shots may be presented in addition to, or in lieu of, a representation of live video data.

According to embodiments, the illustrative method 300 includes receiving (block 310) user input indicating a user selection of a firearm; and presenting (block 312) a simulated sight marking on the representation of the received live video data. In embodiments, the simulated sight marking may be superimposed on the representation of the received live video data (e.g., in an interface associated with the game app), integrated with the representation of the received live video data, and/or the like. The simulated sight marking may include, for example, a shape that is designed to resemble the appearance of a firearm sight when looking at the sight to sight in a target. That is, for example, the simulated sight marking may include a cross-hairs, a circle, concentric circles, a red dot, a green dot, and/or the like. In embodiments, the simulated sight marking that is presented may correspond to the selected firearm. Thus, for example, embodiments may include a simulated sight marking that is a red dot where the size of the red dot is determined based on the type of firearm selected.

Embodiments of the illustrative method 300 further include capturing (block 316), in response to receiving the user input indicating the user selection of the firearm trigger, a still image based on the live video image data. The captured still image may include, for example, a single frame from the live video image data, a combination of frames from the live video image data that are aggregated into a still image, and/or the like. In embodiments, the captured still image may include, for example, a captured image of the user associated with the second mobile device, in addition to the simulated sight marking.

According to embodiments, the method 300 may include determining (block 318) that the second mobile device was within the effective range of the selected firearm at the time of capture of the still image (e.g., the time that the simulated shot was taken). In embodiments, the mobile app may determine that the second mobile device was not within the effective range of the selected firearm at the time of capture of the still image, in which case, the simulated shot would be determined to be a miss, and, in embodiments, a notification may be provided to the second mobile device indicating that the first mobile device attempted a simulated shot that missed.

In the illustrated embodiment, where it is determined that the second mobile device was within the effective range, embodiments of the method 300 may include determining whether the simulated shot was a hit or miss based on whether the simulated sight marking on the representation of the received live video data overlaps the captured image, in the representation of the received live video data, of the user associated with the second mobile device. According to embodiments, the user associated with the second mobile device may be given an opportunity to confirm whether the simulated shot was a hit. For example, as shown in FIG. 3, the illustrated method 300 may include transmitting (block 320), by the first mobile device, the captured still image to the second mobile device.

The captured still image may be presented, via the second display device, to the user associated with the second mobile device, giving that user an opportunity to assess the simulated shot. Upon determining that the simulated shot was a hit, for example (e.g., based on the simulated sight marking overlapping the captured image of the user associated with the second mobile device), the user may provide a user input to the second mobile device that causes the second mobile device to transmit an indication of confirmation to the first mobile device. Accordingly, in embodiments, the method 300 includes receiving (block 322) an indication of confirmation from the second mobile device that the shot was a hit. A shot indicator indicating the hit may be displayed (block 324) via the first display device in response to receiving the indication of confirmation. In embodiments, the shot indicator may be displayed without seeking or receiving a confirmation.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

I claim:

1. A method for facilitating a mobile game experience, the mobile game experience comprising an interactive game in which a first user uses a first mobile device, to simulate targeting a second user, using a second mobile device, with a selected firearm, wherein the first mobile device includes a first display device and the second mobile device includes a second display device, the method comprising:
　　presenting, via the first display device, a map, the map comprising a first location indicator that corresponds to a current location of the first mobile device and a second location indicator that corresponds to a current location of the second mobile device;
　　receiving a user input indicating a user selection of the second mobile device to be a target;
　　receiving a user input indicating a user selection of a selected firearm;
　　determining an effective range of the selected firearm;
　　receiving a user input indicating a user selection of a firearm trigger, wherein the user selection of the firearm trigger corresponds to a simulation of firing a simulated shot at the target;
　　determining, using a global positioning system (GPS) output, a current distance between the first mobile device and the second mobile device;
　　activating, in response to receiving the user input indicating the user selection of the second mobile device to be a target, an imaging device;
　　receiving live video data from the imaging device;
　　presenting, via the first display device, a representation of the received live video data;
　　presenting a simulated sight marking on the representation of the received live video data;
　　capturing, in response to receiving the user input indicating the user selection of the firearm trigger, a still image based on the live video image data, thereby simulating a shot,
　　determining, based on the current distance, the effective range of the selected firearm, and whether the simulated sight marking on the representation of the received live video data overlap a captured image, in the representation of the received live video data, of a user associated with the second mobile device, whether the simulated shot is a hit or a miss; and presenting, via the first display device, a shot indicator that indicates whether the simulated shot was a hit or a miss.

2. The method of claim 1, wherein determining an effective range of the selective firearm comprises referencing a database containing effective ranges of a plurality of firearms.

3. The method of claim 1, further comprising:
determining that the second mobile device is within a targeting zone of the first mobile device; and
providing, via the first mobile device, a proximity indication that indicates that the second mobile device is within the targeting zone of the first mobile device.

4. The method of claim 3, wherein the targeting zone of the first mobile device is a region of space that is within one mile of the first mobile device.

5. The method of claim 1, further comprising:
transmitting, by the first mobile device, the captured still image to the second mobile device; and
receiving a confirmation from the second mobile device that the shot was a hit, wherein the shot indicator indicates that the shot was a hit.

6. The method of claim 1, further comprising:
determining that the shot was a miss; and
providing, in response to determining that the shot was a miss, an indication to the second mobile device that indicates that the shot was a miss.

7. The method of claim 1, wherein the simulated sight marking comprises a red dot.

8. The method of claim 7, wherein a size of the red dot is determined based on the type of the selected firearm.

9. A method for facilitating a mobile game experience, the method comprising:
receiving a first global positioning system (GPS) signal associated with a first mobile device having a first display device, the first GPS signal indicating a current location of the first mobile device;
presenting, via the first display device, a map, the map comprising a first location indicator that corresponds to the current location of the first mobile device;
receiving a second GPS signal associated with a second mobile device having a second display device, the second GPS signal indicating a current location of the second mobile device;
presenting, on the map and via the first display device, a second location indicator that corresponds to the current location of the second mobile device
receiving a user input indicating a user selection of the second mobile device to be a target;
receiving a user input indicating a user selection of a selected firearm;
receiving a user input indicating a user selection of a firearm trigger, wherein the user selection of the firearm trigger corresponds to a simulation of firing a shot at the target;
determining, in response to receiving the user input indicating the user selection of the firearm trigger, a current distance between the first mobile device and the second mobile device;
determining an effective range of the selected firearm;
activating, in response to receiving the user input indicating the user selection of the second mobile device to be a target, an imaging device;

receiving live video data from the imaging device;
presenting, via the first display device, a representation of the received live video data;
presenting simulated sight markings on the representation of the received live video data;
capturing, in response to receiving the user input indicating the user selection of the firearm trigger, a still image based on the live video image data, thereby simulating a shot;
determining, based on the current distance, the effective range of the selected firearm, and whether the simulated sight markings on the representation of the received live video data overlap a captured image, in the representation of the received live video data, of a user associated with the second mobile device, whether the shot is a hit or a miss; and
presenting, via the first display device, a shot indicator that indicates whether the shot was a hit or a miss.

10. The method of claim 9, further comprising:
determining that the second mobile device is within a targeting distance of the first mobile device; and
providing, via the first mobile device, a proximity indication that indicates that the second mobile device is within the targeting distance of the first mobile device.

11. The method of claim 9, further comprising:
transmitting, by the first mobile device, the captured still image to the second mobile device; and
receiving a confirmation from the second mobile device that the shot was a hit, wherein the shot indicator indicates that the shot was a hit.

12. The method of claim 9, further comprising:
determining that the shot was a miss; and
providing, in response to determining that the shot was a miss, an indication to the second mobile device that indicates that the shot was a miss.

13. The method of claim 9, wherein determining an effective range of the selective firearm comprises referencing a database containing effective ranges of a plurality of firearms.

14. One or more computer-readable media having embodied thereon computer-executable instructions that are configured to cause one or more processors, upon execution, to perform a method for facilitating a mobile game experience, the method comprising:
presenting, via the first display device, a map, the map comprising a first location indicator that corresponds to a current location of the first mobile device and a second location indicator that corresponds to a current location of the second mobile device;
receiving a user input indicating a user selection of the second mobile device to be a target;
receiving a user input indicating a user selection of a selected firearm;
determining an effective range of the selected firearm;
receiving a user input indicating a user selection of a firearm trigger, wherein the user selection of the firearm trigger corresponds to a simulation of firing a simulated shot at the target;
determining, using a global positioning system (GPS) output, a current distance between the first mobile device and the second mobile device;
activating, in response to receiving the user input indicating the user selection of the second mobile device to be a target, an imaging device;
receiving live video data from the imaging device;
presenting, via the first display device, a representation of the received live video data;

presenting simulated sight markings on the representation of the received live video data;

capturing, in response to receiving the user input indicating the user selection of the firearm trigger, a still image based on the live video image data;

determining, based on the current distance, the effective range of the selected firearm, and whether the simulated sight markings on the representation of the received live video data overlap a captured image, in the representation of the received live video data, of a user associated with the second mobile device, whether the simulated shot is a hit or a miss; and presenting, via the first display device, a shot indicator that indicates whether the simulated shot was a hit or a miss.

15. The media of claim 14, wherein determining an effective range of the selective firearm comprises referencing a database containing effective ranges of a plurality of firearms.

16. The media of claim 14, the method further comprising:

determining that the second mobile device is within a targeting zone of the first mobile device; and providing, via the first mobile device, a proximity indication that indicates that the second mobile device is within the targeting zone of the first mobile device.

17. The media of claim 16, wherein the targeting zone of the first mobile device is a region of space that is within one mile of the first mobile device.

* * * * *